(12) United States Patent
Rothman et al.

(10) Patent No.: US 7,278,006 B2
(45) Date of Patent: Oct. 2, 2007

(54) REDUCING MEMORY FRAGMENTATION

(75) Inventors: Michael A. Rothman, Puyallup, WA (US); Vincent J. Zimmer, Federal Way, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 11/027,715

(22) Filed: Dec. 30, 2004

(65) Prior Publication Data

US 2006/0149913 A1    Jul. 6, 2006

(51) Int. Cl.
   *G06F 12/00* (2006.01)
(52) U.S. Cl. ..................................... 711/170
(58) Field of Classification Search ............... 711/170; 713/2
   See application file for complete search history.

(56) References Cited

U.S. PATENT DOCUMENTS 5,963,982 A    10/1999  Goldman
6,324,631 B1   11/2001  Kuiper
6,832,303 B2 * 12/2004  Tanaka ..................... 711/173
7,100,009 B2 *  8/2006  Schopp ..................... 711/163

FOREIGN PATENT DOCUMENTS

EP          1 128 254 A2      8/2001
WO  PCT/US2005/046576         6/2006

OTHER PUBLICATIONS

INTEL, "Intel® Platform Innovation Framework for EFI Architecture Specification." ftp://download.intel.com/technology/framework/docs/FAS.pdf, Sep. 16, 2003, Version 0.9, pp. ii-119.

* cited by examiner

*Primary Examiner*—Hiep T. Nguyen
(74) *Attorney, Agent, or Firm*—Blakely, Sokoloff, Taylor & Zafman LLP

(57) ABSTRACT

Reducing memory fragmentation. Memory is allocated during a preboot phase of a computer system, wherein the memory is allocated based on a plurality of memory types. Fragmentation of memory is determined, wherein a fragment includes a contiguous block of memory of the same type. At least a portion of memory allocated to a firmware module is coalesced based on the plurality of memory types if the fragmentation is greater than a threshold. An operating system is booted by the computer system.

20 Claims, 6 Drawing Sheets

FIRMWARE MEMORY MANAGER RE-MAP
500

REDUCING MEMORY FRAGMENTATION

BACKGROUND

1. Field

Embodiments of the invention relate to the field of computer systems and more specifically, but not exclusively, to reducing memory fragmentation.

2. Background Information

In typical computer architecture, the initialization and configuration of the computer system by the Basic Input/Output System (BIOS) is commonly referred to as the preboot phase. The preboot phase is generally defined as the time when firmware runs between the processor reset and the Operating System (OS) Loader. At the start of a preboot, it is up to the code in the firmware to initialize the system to the point that an operating system loaded off of media, such as a hard disk, can take over. The start of the OS load begins the period commonly referred to as OS runtime. During OS runtime, the firmware may act as an interface between software and hardware components of a computer system as well as handle system-related tasks. As computer systems have become more sophisticated, the operational environment between the OS level and the hardware level is generally referred to as the firmware or the firmware environment.

During preboot, a preboot memory map is formed that is handed off to the operating system. The preboot memory map indicates memory addresses that are reserved for system use and those that are available to the OS. The OS uses this preboot memory map to form its own memory management scheme. Due to the growing complexity of the preboot phase, the preboot memory map often has numerous fragmented sections. Many of today's operating systems are unable to support preboot memory maps that have excessive fragmentation.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the firmware environment described herein may be implemented substantially in compliance with the Extensible Firmware Interface (EFI) (*Extensible Firmware Interface Specification*, Version 1.10, Dec. 1, 2002, available at http://developer.intel.com/technology/efi.) EFI enables firmware, in the form of firmware modules, such as drivers, to be loaded from a variety of different resources, including flash memory devices, option ROMs (Read-Only Memory), other storage devices, such as hard disks, CD-ROM (Compact Disk-Read Only Memory), or from one or more computer systems over a computer network. One embodiment of an implementation of the EFI specification is described in the *Intel® Platform Innovation Framework for EFI Architecture Specification—Draft for Review*, Version 0.9, Sep. 16, 2003, referred to hereafter as the "Framework" (available at www.intel.com/technology/framework). It will be understood that embodiments of the present invention are not limited to the "Framework" or implementations in compliance with the EFI specification.

Figure 1:
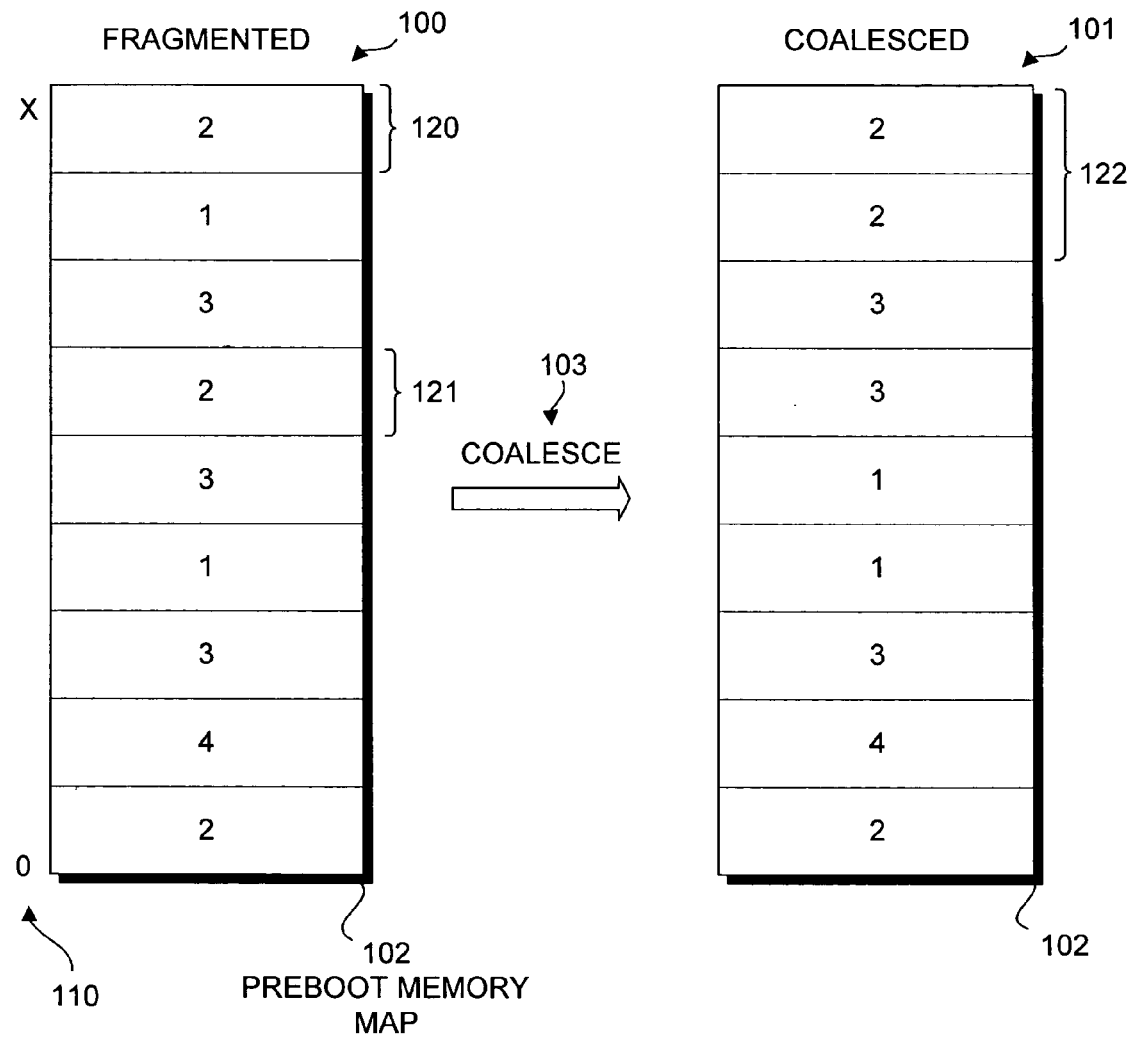
FIG. 1 is a block diagram illustrating one embodiment of reducing memory fragmentation in accordance with the teachings of the present invention.
Figure 1:
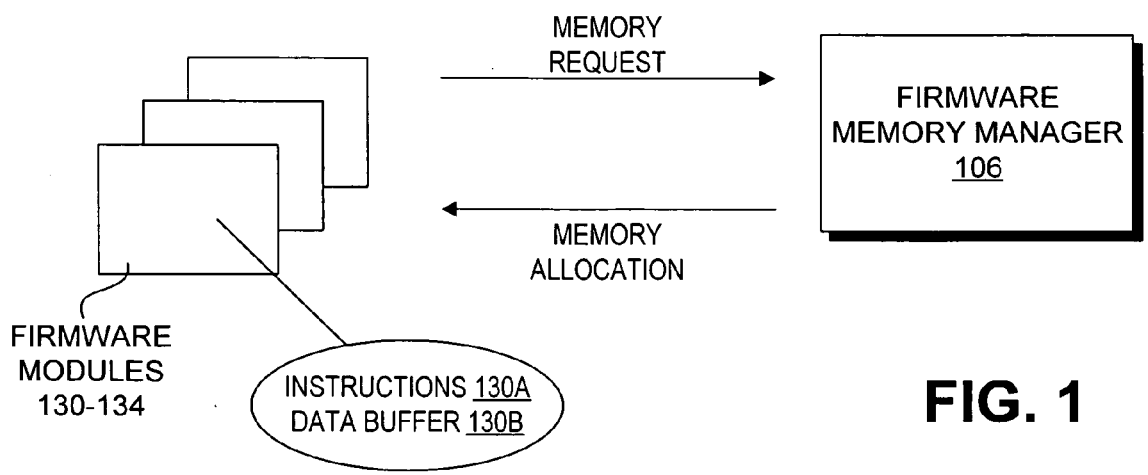

Turning to FIG. 1, an embodiment of reducing memory fragmentation is shown. A preboot memory map 102 describes the allocation of memory addresses 0 to X, shown at 110, of physical memory during the preboot phase. In one embodiment, preboot memory map 102 includes an Advanced Configuration and Power Interface (ACPI) E820 table (*Advanced Configuration and Power Interface Specification*, version 2.0b, Oct. 11, 2002). In general, the E820 table describes what physical memory is available to the OS, reserved for the system, or non-existent.

During preboot, various memory types are allocated to firmware modules 130-134. In one embodiment, a firmware module may include a set of related instructions, commonly referred to as code, and/or a data buffer. In FIG. 1, firmware module 130 includes instructions 130A and a data buffer 130B. Data buffer 130B may be used by instructions 130A for depositing and retrieving various data for various purposes. The instructions and the data buffer may not necessarily by assigned to contiguous memory addresses, but may be at separate memory address blocks. A firmware module may include a driver, such as an EFI driver, a function call, a protocol, or the like. Some embodiments of firmware modules may not survive into OS runtime, while other firmware modules are available during preboot and OS runtime.

During the firmware module load process, a firmware module may request a memory allocation of one or more memory types of various sizes from a firmware memory manager 106. In one embodiment, firmware memory manager 106 may survive into OS runtime. Firmware memory manager 106 may assign the firmware module memory addresses corresponding to the requested memory types.

This allocation of memory may result in fragmentation of the preboot memory map 102. As used herein, a fragment includes a contiguous block of a certain type of memory. In the embodiment of FIG. 1, preboot memory map 102 is fragmented into 4 types of memory, types 1-4. For example, a fragment 120 is made up of memory type 2.

After coalescing, as shown at 103, preboot memory map 102 is coalesced, as shown at 101. The coalescing is based on the memory type such that the same memory types are moved together to form contiguous blocks. In one embodiment, all memory fragments may be coalesced. In another embodiment, the preboot memory map is coalesced one firmware module at a time until the memory fragmentation is below a predetermined threshold level (discussed below). For example, in FIG. 1, fragment 120 and fragment 121 of type 2 memory are coalesced into fragment 122 of type 2 memory. Thus, two fragments have been coalesced into one fragment.

In one embodiment, memory types include types as described by the ACPI specification. These ACPI memory types are shown below in Table 1.

TABLE 1

| ACPI TYPE | MNEMONIC | DESCRIPTION |
|---|---|---|
| 1 | AddressRangeMemory | Useable by OS. |
| 2 | AddressRangeReserved | Reserved for system use (not for OS use). |
| 3 | AddressRangeACPI | Useable by OS after the OS reads the ACPI tables. |
| 4 | AddressRangeNVS | Reserved for system use (not for OS use). |

In an ACPI-compliant system during reboot, the firmware will report the E820 table to the Operating System-directed configuration and Power Management (OSPM). In short, the OSPM is an interface between the operating system and ACPI functionality. When the OS takes control, the OS will use the E820 table to construct its own memory mapping.

In an ACPI-compliant system, there are a variety of ways for the firmware to convey memory mapping to the OSPM. In one method, an INT 15 BIOS interface is used in Intel Architecture (IA) systems to convey the preboot memory map to the OS. In another method, if memory resources may be added or removed dynamically, memory devices are defined in the ACPI Namespace conveying the resource information described by memory resources.

In an EFI-compliant system, an EFI Boot Services function (GetMemoryMap( )) may be used to convey the preboot memory map to the OS Loader. This mapping is then conveyed by the OS Loader to the OSPM. GetMemoryMap( ) returns various EFI memory descriptors. These EFI memory descriptors define a system memory mapping of all the installed Random Access Memory (RAM) and of physical memory ranges reserved by the firmware. Table 2 below shows a sampling of EFI memory types and their corresponding ACPI address range types.

TABLE 2

| EFI TYPE | MNEMONIC | DESCRIPTION | ACPI TYPE |
|---|---|---|---|
| 1 | EFI LoaderCode | For OS Loader and/or OS use. | 2 |

TABLE 2-continued

| EFI TYPE | MNEMONIC | DESCRIPTION | ACPI TYPE |
|---|---|---|---|
| 2 | EFI LoaderData | For OS Loader and/or OS use. | 1 |
| 3 | EFI BootServicesCode | Available for general use. | 1 |
| 4 | EFI BootServicesData | Available for general use. | 1 |
| 5 | EFI RuntimeServiceCode | OS and OS Loader must preserve. | 2 |

Embodiments herein provide for reducing memory fragmentation. For example, Red Hat Linux and Suse Linux may not support preboot memory maps that have an excess of 32 fragments. In an ACPI system, this corresponds to 32 E820 table entries. In another example, Windows server operating systems may not support preboot memory maps having greater than 64 fragments. As platform complexity increases and firmware environments become more robust, fragmentation may exceed 32 fragments.

Embodiments herein provide for dynamic preboot memory map defragging. Under a static scheme, a variety of "buckets" of memory types may be pre-allocated. During preboot, a usage profile for each memory type may be saved in non-volatile storage based on the initial boot. Then, the system is rebooted and the "buckets" are reapportioned based on the usage profile.

However, such a static scheme in not practical. First, such a static scheme does not provide for changes in system configuration that may also change the fragmentation of the preboot memory map.

Further, some platforms, such as servers, must meet an "up" requirement of 5-9's. 5-9's is a standard customer requirement that servers must be available for 99.999% of the time. This 5-9's of availability equates to an acceptable down time of only minutes a year. Such a requirement cannot tolerate a lengthy reboot process to coalesce the preboot memory map, such as in a static scheme. Embodiments herein allow for defragging of the preboot memory map without requiring a reboot of the computer system.

Figure 2:
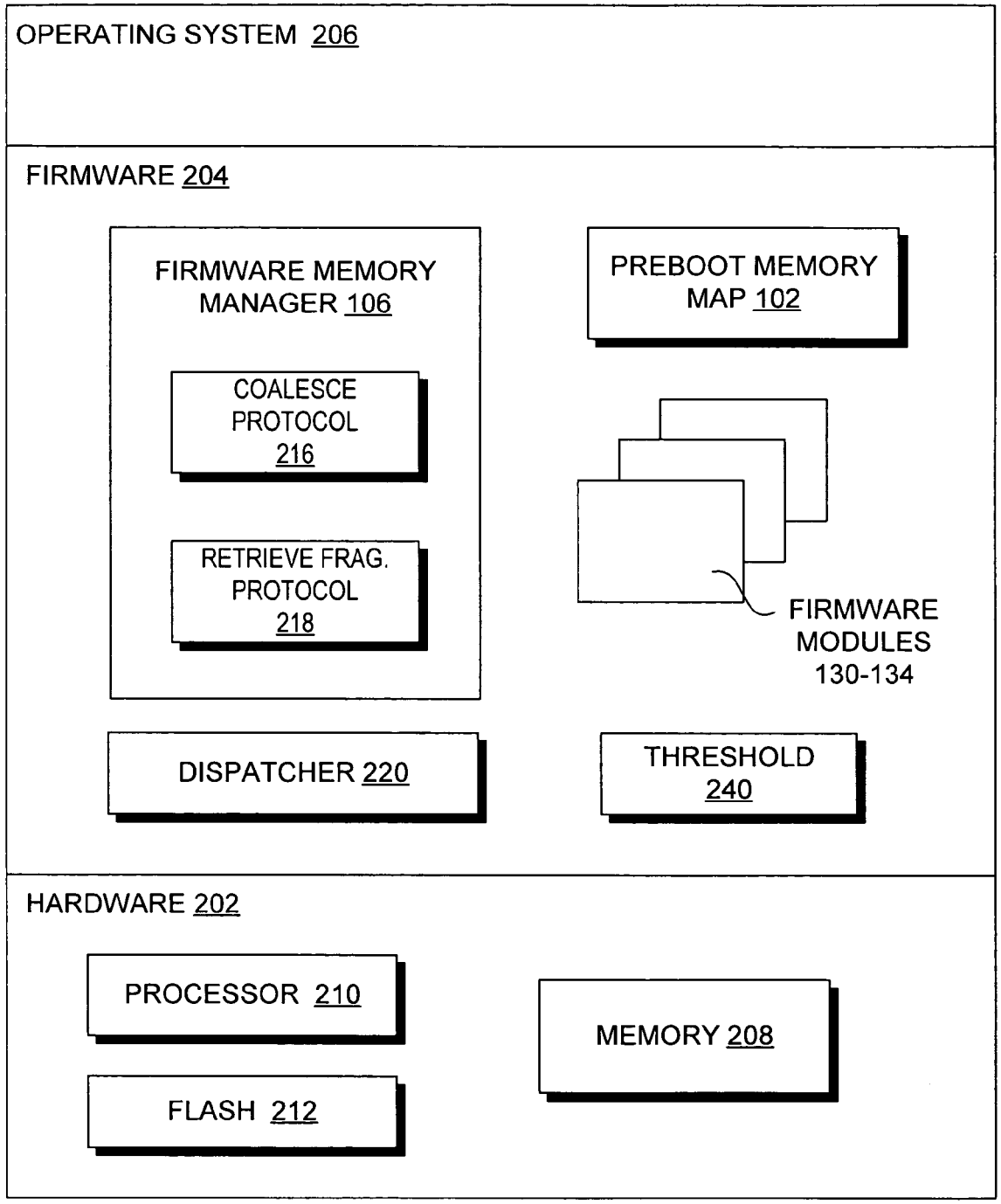
FIG. 2 is a block diagram illustrating one embodiment of an environment to support reducing memory fragmentation in accordance with the teachings of the present invention.

Turning to FIG. 2, an embodiment of a computer system 200 to support reducing memory fragmentation is shown. Firmware 204 is layered on hardware 202. Operating system 206 is layered on firmware 204.

Hardware 202 includes a processor 210, Flash memory 212, and memory 208. In one embodiment, machine-accessible instructions for reducing memory fragmentation as described herein are stored in Flash memory 212. In another embodiment, instructions to reduce memory fragmentation that are substantially in compliance with the EFI specification are stored in Flash memory 212. In alternative embodiments, other types of non-volatile storage, such as Read-Only Memory (ROM) may be used in place of or in addition to Flash memory 212.

Firmware layer 204 supports preboot memory map 102, firmware memory manager 106, firmware modules 130-134, dispatcher 220, and threshold 240. In the embodiment of FIG. 2, firmware memory manager 106 provides a coalesce protocol 216 and a retrieve fragmentation protocol 218. In one embodiment, instructions to support firmware memory manager 106, coalesce protocol 216, and retrieve fragmentation protocol 218 are stored in Flash memory 212. Firmware memory manager 106, coalesce protocol 216, and retrieve fragmentation protocol 218 will be described further below.

In one embodiment, threshold 240 is used in determining if the memory described by preboot memory map 102 needs to be coalesced. In one embodiment, threshold 240 corresponds to 32 fragments; in another embodiment, threshold 240 corresponds to 64 fragments. In yet another embodiment, threshold 240 is stored with other system configuration information in non-volatile storage of computer system 200. Such non-volatile storage may include Flash memory 212, or Non-Volatile Random Access Memory (NVRAM) having stored EFI variables.

In one embodiment, dispatcher 220 may be used with an "opt-in" implementation of reducing fragmentation as described below in conjunction with FIG. 4. In one embodiment of the Framework, dispatcher 220 includes a Boot Device Selection (BDS) protocol.

In general, dispatcher 220 receives a "handle" from firmware modules that report opting-in to the coalesce protocol. The handle provides a means for identifying and contacting the firmware modules by dispatcher 220. Dispatcher 220 registers firmware modules that support coalescing.

Figure 3:
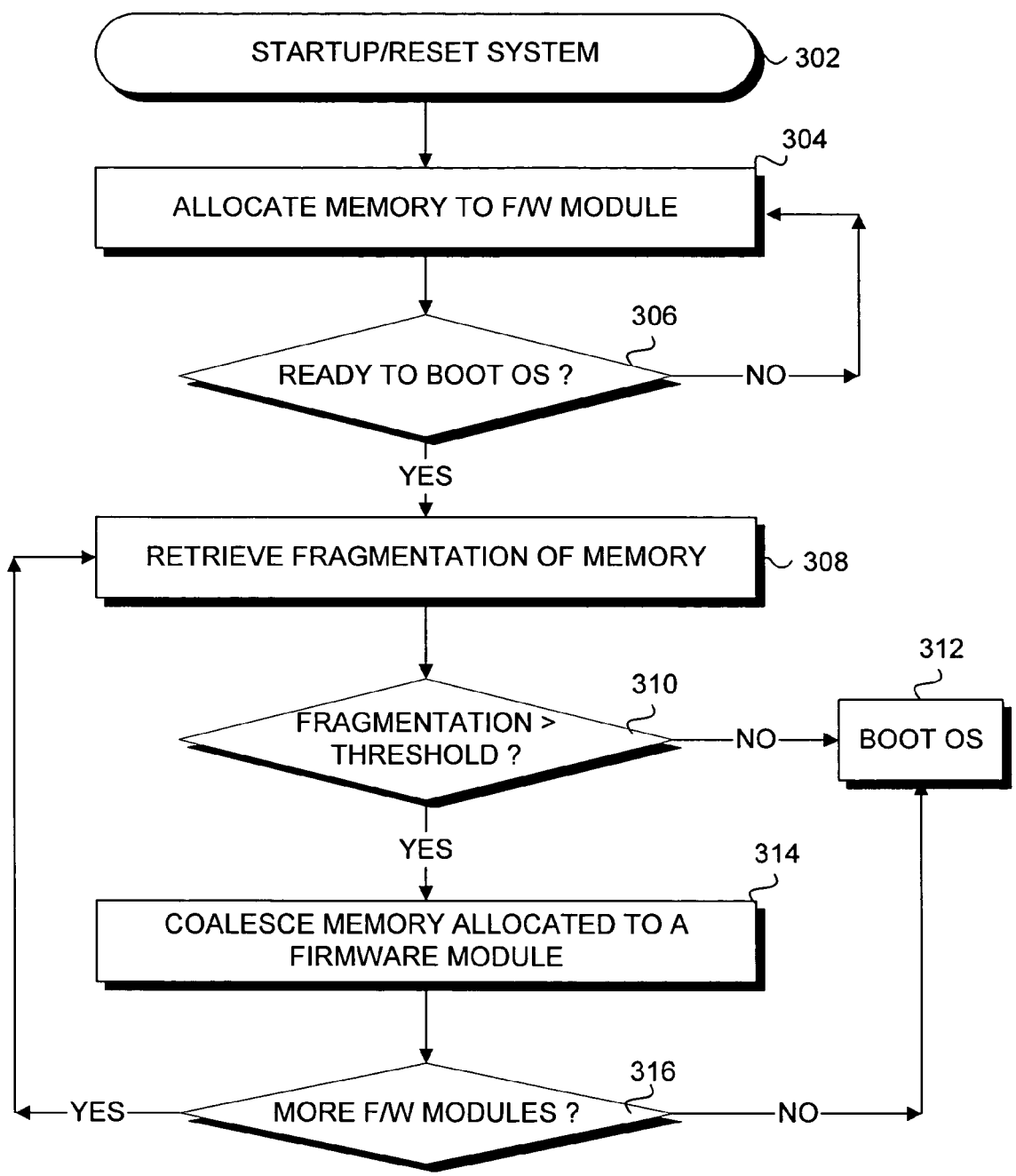
FIG. 3 is a flowchart illustrating one embodiment of the logic and operations to reduce memory fragmentation in accordance with the teachings of the present invention.

Referring to FIG. 3, an embodiment of a flowchart 300 to reduce memory fragmentation is shown. Starting in a block 302, a computer system is started up or reset. Proceeding to a block 304, memory is allocated by the firmware memory manager to a firmware (F/W) module during preboot. When a firmware module is initiated, the firmware module requests an allocation of a memory type from the firmware memory manager. The firmware memory manager assigns a memory address range of the requested type to the firmware module.

Continuing to a decision block 306, the logic determines if the firmware is ready to boot the operating system. In an EFI-compliant embodiment, a ReadyToBoot event is issued to the system. In an EFI system, firmware entities, such as firmware modules, will register to pay attention to a given set of events. Upon the event triggering, such as a ReadyToBoot event, an entity will be notified and the entity will execute various tasks in response, such as cleanup, or the like. In one embodiment, these tasks may include a coalesce as described herein.

If the answer to decision block 306 is no, then the logic proceeds back to block 304 to continue allocating memory to firmware modules. If the answer to decision block 306 is yes, then the logic continues to a block 308.

In block 308, the fragmentation of memory is retrieved. In one embodiment, the retrieve fragmentation protocol is called and the retrieve fragmentation protocol returns the number of fragments in the preboot memory map.

Proceeding to a block 310, the logic determines if the fragmentation of the preboot memory map is above a threshold. If the answer is no, then the logic proceeds to a block 312 to boot the operating system. If the answer is yes, then the logic proceeds to a block 314 to coalesce memory allocated to a firmware module.

In one embodiment, the coalescing will map a portion of the firmware module, such as the firmware module's data buffer, into a contiguous block of similar memory type thus reducing the fragmentation of memory. For example, in this particular embodiment, the instructions portion of the firmware module may stay at the originally allocated memory location, but the data buffer portion may be moved to a new location as part of the coalescing. In another embodiment, the whole firmware module will be coalesced.

In one embodiment, a coalesce protocol is called to coalesce the firmware module. The coalesce protocol may return a pointer to the new memory location of the firmware module. It will be understood that methods to defrag a storage medium, such as memory or a hard disk, are well known to one skilled in the art.

Continuing to a decision block 316, the logic determines if there are more firmware modules to coalesce. If the answer is yes, then the logic returns to block 308. If the answer to decision block 316 is no, then the logic proceeds to block 312 to boot the OS.

Figure 4:
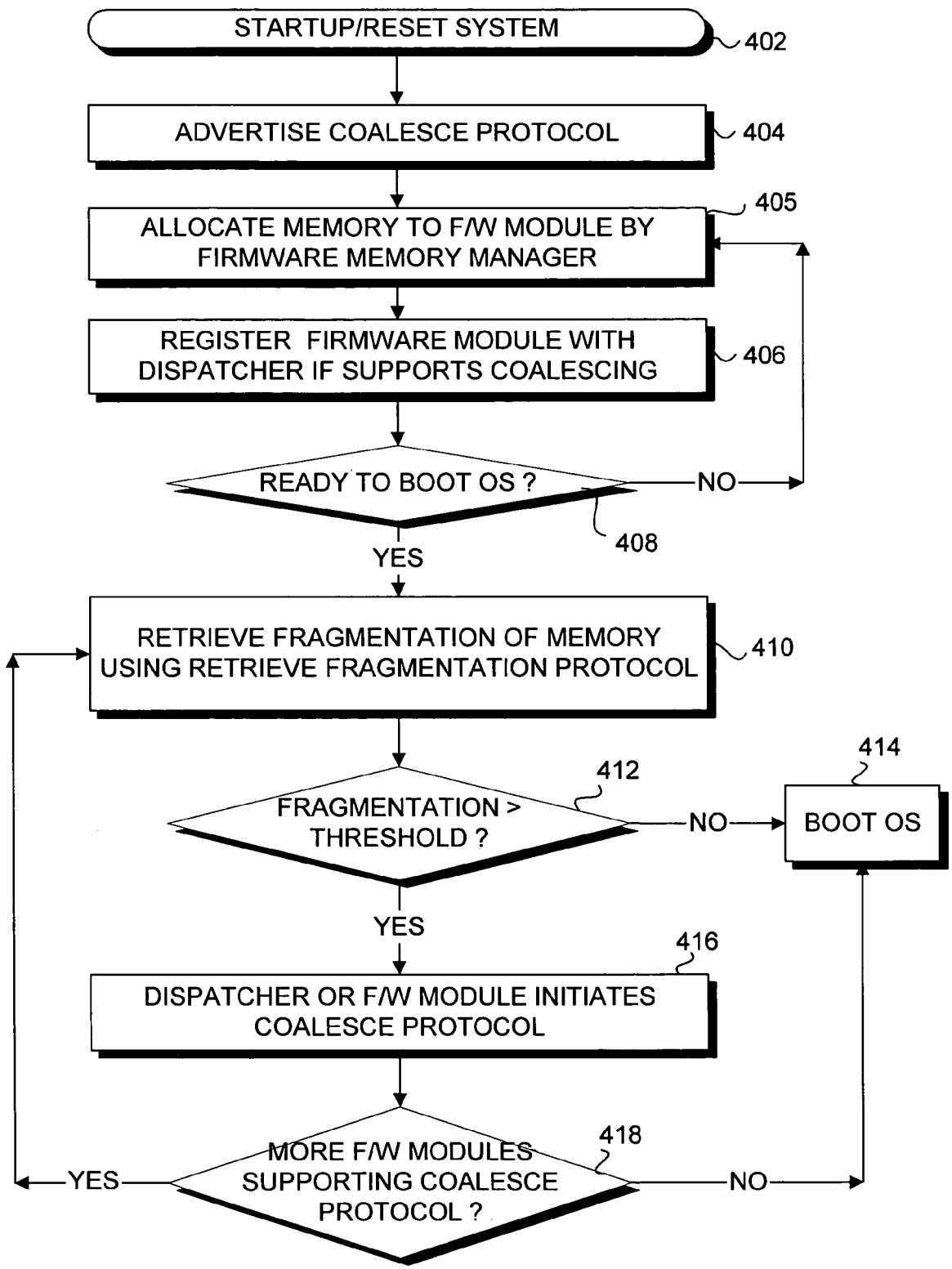
FIG. 4 is a flowchart illustrating one embodiment of the logic and operations to reduce memory fragmentation in accordance with the teachings of the present invention.

Turning to FIG. 4, a flowchart 400 shows one embodiment to reduce memory fragmentation. Flowchart 400 illustrates a firmware module opt-in scheme where firmware modules register whether they are coded to support coalescing.

Starting in a block 402, the computer system is reset/started up. Continuing to a block 404, the coalesce protocol is advertised to firmware modules by the firmware memory manager. In one embodiment, to advertise the coalesce protocol, the firmware memory manager passes a pointer to the firmware modules indicating a memory address of the coalesce protocol.

Continuing to a block 405, memory is allocated by the firmware memory manager to a firmware module loaded during preboot. Continuing to a block 406, if the firmware module supports coalescing, then this information is registered with the dispatcher.

Continuing to a decision block 408, the logic determines if the system is ready to boot the operating system. If the answer to decision block 408 is no, then the logic returns to block 405. If the answer to decision block 408 is yes, then the logic continues to a block 410.

At block 410, the fragmentation of memory is retrieved using the retrieve fragmentation protocol. Proceeding to a decision block 412, the logic determines if the fragmentation is above the threshold. If the answer is no, then the logic continues to block 414 to boot the OS. If the answer to decision block 412 is yes, then the logic continues to a block 416 to initiate the coalesce protocol for the firmware module. In one embodiment, the firmware module calls the coalesce protocol. In another embodiment, the dispatcher calls the coalesce protocol.

Continuing to a decision block 418, the logic determines if there are more firmware modules that support the coalesce protocol. In one embodiment, the list of registered firmware modules that support coalescing maintained by the dispatcher is consulted.

If the answer to decision block 418 is no, then the logic proceeds to block 414 to boot the OS. If the answer to decision block 418 is yes, then the logic returns to block 410 to retrieve the fragmentation of memory.

In the embodiment of FIG. 4, it will be understood that the firmware modules are coded to take advantage of coalescing as described herein. Embodiments herein may work with a set of firmware modules that are a mix of coalescing participants and non-participants. The opt-in scheme of flowchart 400 allows for providers of firmware modules to take advantage of coalescing as desired.

Figure 5:
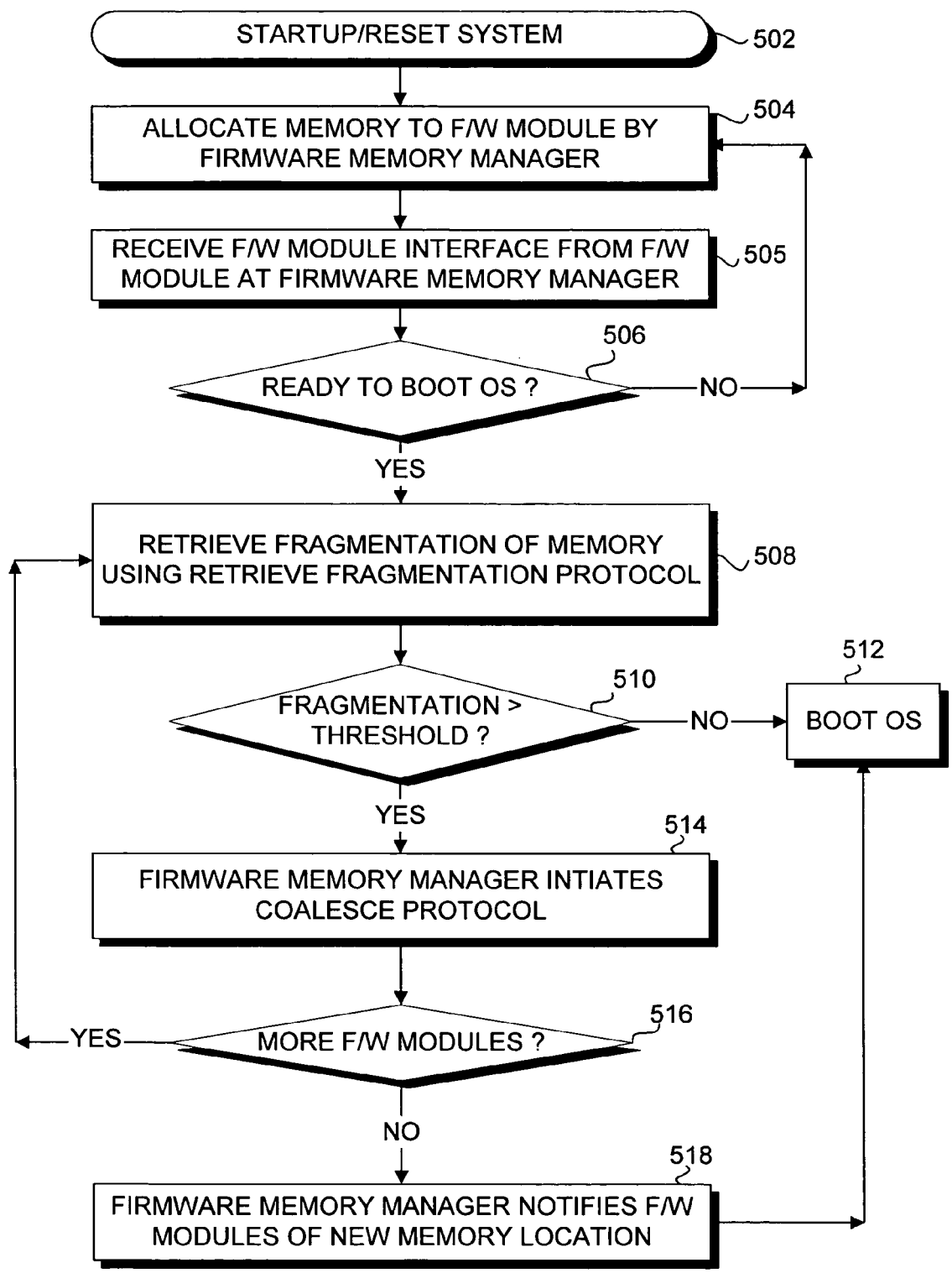
FIG. 5 is a flowchart illustrating one embodiment of the logic and operations to reduce memory fragmentation in accordance with the teachings of the present invention.

Turning to FIG. 5, a flowchart 500 shows one embodiment to reduce memory fragmentation. Flowchart 500 illustrates an embodiment where the coalescing is directed by the firmware memory manager. In this embodiment, the firmware memory manager takes advantage of its omnipotent knowledge of memory allocation.

Beginning in a block 502, the computer system is started up/reset. Continuing to a block 504, the firmware memory manager allocates memory to a firmware module. Continuing to a block 505, the firmware memory manager receives a firmware module interface from the firmware module that enables the firmware memory manager to notify the firmware module of its new memory location after coalescing.

Proceeding to a decision block 506, the logic determines if the system is ready boot an OS. If the answer to decision block 506 is no, then the logic returns to block 504. If the answer to decision block 506 is yes, then the logic proceeds to a block 508.

In block 508, the fragmentation of memory is retrieved using the retrieve fragmentation protocol by the firmware memory manager. Continuing to a decision block 510, the logic determines if the fragmentation is greater than the threshold. If the answer is no, then the OS is booted, as shown in block 512. If the answer is yes, then the logic continues to a block 514.

In block 514, the firmware memory manager initiates the coalesce protocol for the firmware module. Proceeding to a decision block 516, the logic determines if there are more firmware modules that have not been through the coalesce process. If the answer to decision block 516 is yes, then the logic returns to block 508.

If the answer to decision block 516 is no, then the logic proceeds to a block 518 where the firmware memory manager notifies the firmware modules that have been coalesced of their new memory locations. In one embodiment, firmware memory manager passes the firmware module a pointer to the new location of their data buffer. In one embodiment, the firmware memory manager may notify a firmware module using the firmware module interface that was passed to the firmware memory manager in block 505.

Embodiments herein provide for reducing memory fragmentation dynamically and without requiring a reboot of the computer system. Some IA32 and Extended Memory 64 Technology (EM64T) operating systems do not support more than 32 E820 table entries. In short, EM64T enables 32-bit systems to address memory above the 4 Gigabyte line. In an EFI-compliant system, the E820 table is essentially a translation of the EFI memory map and thus the number of E820 entries is proportional to the degree of fragmentation of EFI firmware modules.

Figure 6:
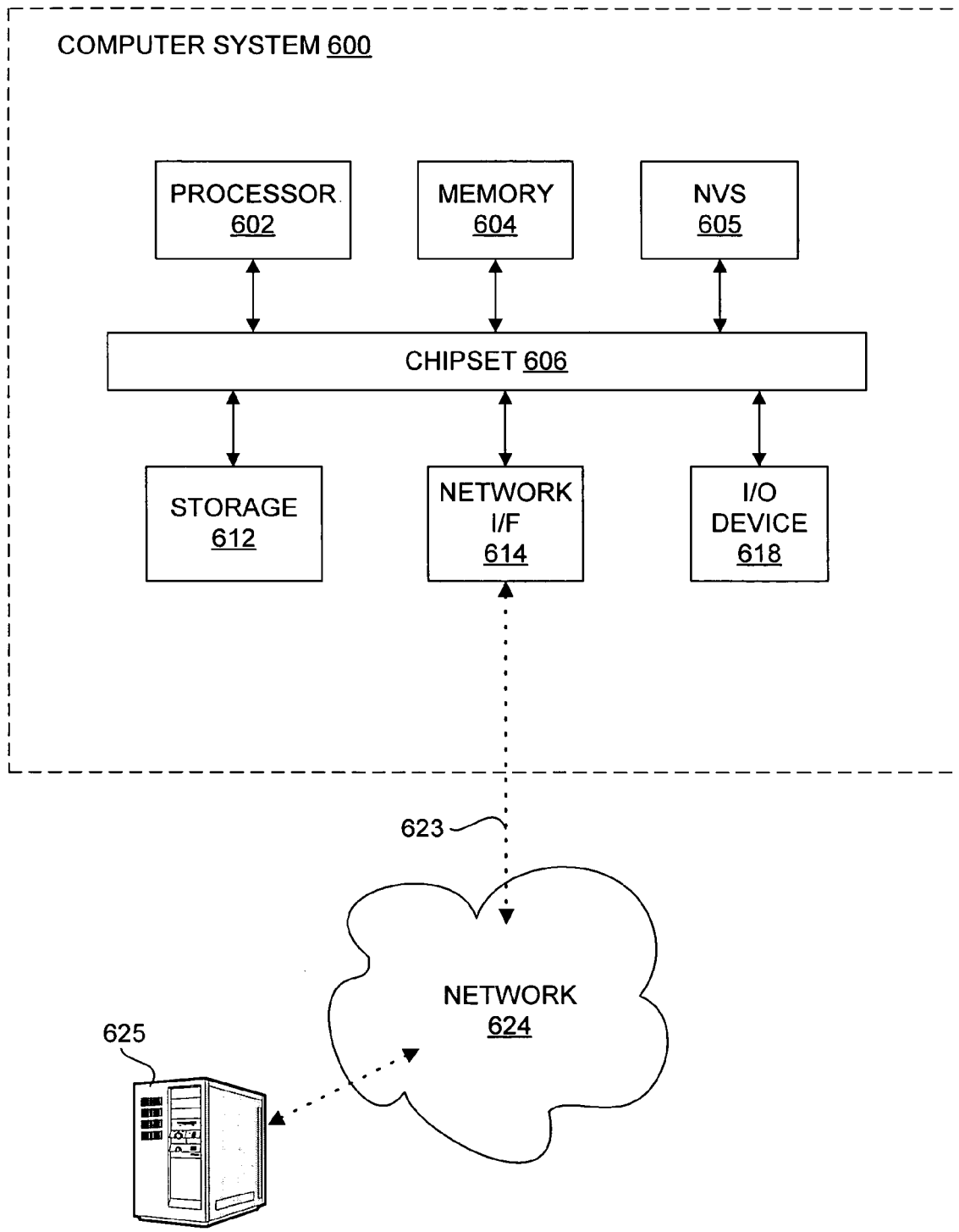
FIG. 6 is a block diagram illustrating one embodiment of a computer system to implement embodiments of the present invention.

FIG. 6 is an illustration of one embodiment of an example computer system 600 on which embodiments of the present invention may be implemented. Computer system 600 includes a processor 602 and a memory 604 coupled to a chipset 606. Storage 612, non-volatile storage (NVS) 605, network interface 614, and Input/Output (I/O) device 618 may also be coupled to chipset 606. Embodiments of computer system 600 include, but are not limited to, a desktop computer, a notebook computer, a server, a personal digital assistant, a network workstation, or the like. In one embodiment, computer system 600 includes at least processor 602 coupled to memory 604, processor 602 to execute instructions stored in memory 604.

Processor 602 may include, but is not limited to, an Intel Corporation x86, Pentium®, Xeon®, or Itanium® family processor, or the like. In one embodiment, computer system 600 may include multiple processors. Memory 604 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like.

Chipset 606 may include a Memory Controller Hub (MCH), an Input/Output Controller Hub (ICH), or the like. Chipset 606 may also include system clock support, power management support, audio support, graphics support, or the like. In one embodiment, chipset 606 is coupled to a board that includes sockets for processor 602 and memory 604.

Components of computer system 600 may be connected by various buses including a Peripheral Component Interconnect (PCI) bus, a System Management bus (SMBUS), a Low Pin Count (LPC) bus, a Serial Peripheral Interface (SPI) bus, an Accelerated Graphics Port (AGP) interface, or the like. I/O device 618 may include a keyboard, a mouse, a display, a printer, a scanner, or the like.

The computer system 600 may interface to external systems through network interface 614. Network interface 614 may include, but is not limited to, a modem, a network interface card (NIC), or other interfaces for coupling a computer system to other computer systems. A carrier wave signal 623 is received/transmitted by network interface 614. In the embodiment illustrated in FIG. 6, carrier wave signal 623 is used to interface computer system 600 with a network 624, such as a Local Area Network (LAN), a Wide Area Network (WAN), the Internet, or any combination thereof. In one embodiment, network 624 is further coupled to a computer system 625 such that computer system 600 and computer system 625 may communicate over network 624.

The computer system 600 also includes non-volatile storage 605 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 612 includes, but is not limited to, a magnetic hard disk, a magnetic tape, an optical disk, or the like. It is appreciated that instructions executable by processor 602 may reside in storage 612, memory 604, non-volatile storage 605, or may be transmitted or received via network interface 614.

It will be appreciated that in one embodiment, computer system 600 may execute Operating System (OS) software. For example, one embodiment of the present invention utilizes Microsoft Windows® as the operating system for computer system 600. Other operating systems that may also be used with computer system 600 include, but are not limited to, the Apple Macintosh operating system, the Linux operating system, the Unix operating system, or the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.). In addition, a machine-accessible medium may include propagated signals such as electrical, optical, acoustical or other forms of propagated signals (e.g., carrier waves, infrared signals, digital signals, etc.).

Embodiments of various operations of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
    allocating memory to a firmware module during a preboot phase of a computer system, wherein the memory is allocated based on a plurality of memory types;
    determining fragmentation of memory, wherein a fragment includes a contiguous block of memory of the same type;
    coalescing at least a portion of memory allocated to the firmware module based on the plurality of memory types if the fragmentation is greater than a threshold; and
    booting an operating system by the computer system.

2. The method of claim 1 wherein the computer system is not reset between coalescing memory allocated to the firmware module and booting the operating system.

3. The method of claim 1 wherein the memory allocated to the firmware module is coalesced if the firmware module supports coalescing.

4. The method of claim 3, further comprising registering the firmware module with a dispatcher if the firmware module supports coalescing, the dispatcher to track firmware modules that support coalescing.

5. The method of claim 3 wherein the coalescing is initiated by one of the firmware module and the dispatcher.

6. The method of claim 1 wherein coalescing at least a portion of memory allocated to the firmware module comprises:
    initiating the coalescing by a firmware memory manager; and
    notifying the firmware module by the firmware memory manager of a new memory location of the at least a portion of memory allocated to the firmware module as a result of the coalescing.

7. The method of claim 1 wherein the plurality of memory types include Advanced Configuration and Power Interface (ACPI) memory types.

8. The method of claim 1 wherein coalescing at least a portion of memory allocated to the firmware module includes coalescing memory used as a data buffer by the firmware module.

9. An article of manufacture comprising:
    a tangible machine-readable medium including a plurality of instructions stored thereon, which when executed perform operations comprising:
    allocating memory by a firmware memory manager to a firmware module during a preboot phase of a computer system, wherein the memory is allocated from a plurality of memory types in response to a request from the firmware module;
    initiating a retrieve fragmentation protocol to determine fragmentation of memory described by a preboot memory map, wherein a fragment includes a contiguous block of memory of the same type;
    initiating a coalesce protocol to coalesce at least a portion of memory allocated to the firmware module based on the plurality of memory types if the fragmentation is greater than a threshold; and
    booting an operating system on the computer system.

10. The article of manufacture of claim 9 wherein the computer system is not reset between initiating the coalesce protocol and booting the operating system.

11. The article of manufacture of claim 9 wherein the firmware module includes an instruction portion and a data buffer portion, the coalesce protocol to coalesce the data buffer portion.

12. The article of manufacture of claim 9 wherein memory allocated to the firmware module is coalesced if the firmware module is coded to support the coalesce protocol.

13. The article of manufacture of claim 12 wherein execution of the plurality of instructions further perform operations comprising:
    registering the firmware module with a dispatcher if the firmware module is coded to support the coalesce protocol.

14. The article of manufacture of claim 9 wherein initiating the coalesce protocol includes:
    initiating the coalesce protocol by the firmware memory manager; and
    notifying the firmware module of a new memory location of the at least a portion of memory allocated to the firmware module by the firmware memory manager as a result of the coalescing, wherein the firmware memory manager uses a firmware module interface received from the firmware module to notify the firmware module of the new memory location.

15. The article of manufacture of claim 9 wherein the plurality of memory types include Advanced Configuration and Power Interface (ACPI) memory types.

16. The article of manufacture of claim 9 wherein the plurality of instructions are substantially in compliance with an Extensible Firmware Interface specification.

17. A computer system, comprising:
    a processor;
    an Synchronized Dynamic Random Access Memory (SDRAM) unit coupled to the processor; and
    a storage unit coupled to the processor, wherein the storage unit includes a plurality of instructions which when executed by the processor perform operations comprising:
    allocating SDRAM to a firmware module during a preboot phase of the computer system, wherein the SDRAM is allocated based on a plurality of Advanced Configuration and Power Interface (ACPI) memory types;
    initiating a retrieve fragmentation protocol to determine fragmentation of the SDRAM described by a preboot memory map, wherein a fragment includes a contiguous block of SDRAM of the same ACPI memory type;
    initiating a coalesce protocol to coalesce at least a portion of SDRAM allocated to the firmware module based on the plurality of ACPI memory types if the fragmentation is greater than a threshold; and booting an operating system on the computer system.

18. The system of claim 17 wherein the computer system is not reset between initiating the coalesce protocol and booting the operating system.

19. The system of claim 17 wherein SDRAM allocated to the firmware module is coalesced if the firmware module supports the coalesce protocol.

20. The system of claim 17 wherein initiating the coalesce protocol includes:

initiating the coalesce protocol by the firmware memory manager; and notifying the firmware module of a new memory location of the SDRAM allocated to the firmware module as a result of the coalescing by the coalesce protocol.

\* \* \* \* \*